(12) United States Patent
Ding et al.

(10) Patent No.: US 8,380,635 B2
(45) Date of Patent: Feb. 19, 2013

(54) USER FEEDBACK METHOD AND SYSTEM FOR BUSINESS SUITE CUSTOMIZATION

(75) Inventors: Wei Ding, Beijing (CN); Feng Chun Wang, Beijing (CN); Xin Zhou, Beijing (CN); Jun Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 12/845,120

(22) Filed: Jul. 28, 2010

(65) Prior Publication Data

US 2011/0029948 A1  Feb. 3, 2011

(30) Foreign Application Priority Data

Jul. 31, 2009 (CN) .......................... 2009 1 0161823

(51) Int. Cl.
*G06Q 20/00* (2006.01)
(52) U.S. Cl. ......... 705/63; 705/1.1; 705/7.12; 705/7.25; 715/744; 715/826; 715/866
(58) Field of Classification Search ................... 705/1.1, 705/7.12; 715/744, 826, 866
See application file for complete search history.

(56) References Cited

U.S. PATENT DOCUMENTS

| | | | |
|---|---|---|---|
| 640,776 A1 | 6/2002 | Ching et al. | |
| 2002/0007318 A1* | 1/2002 | Alnwick | 705/26 |
| 2003/0160101 A1* | 8/2003 | Wiedenhoefer | 235/462.46 |
| 2003/0163472 A1* | 8/2003 | Hartley et al. | 707/10 |
| 2003/0213844 A1* | 11/2003 | Yoshida et al. | 235/383 |
| 2005/0125313 A1* | 6/2005 | Untiedt et al. | 705/28 |
| 2005/0289166 A1* | 12/2005 | Stanley et al. | 707/100 |
| 2006/0165040 A1* | 7/2006 | Rathod et al. | 370/335 |
| 2007/0133522 A1* | 6/2007 | Morgan | 370/352 |
| 2007/0136093 A1* | 6/2007 | Rankin et al. | 705/2 |
| 2007/0136153 A1* | 6/2007 | Chun et al. | 705/28 |
| 2008/0082572 A1 | 4/2008 | Ballard et al. | |
| 2008/0175460 A1* | 7/2008 | Reiner | 382/131 |
| 2009/0031295 A1 | 1/2009 | Zhao et al. | |
| 2009/0063988 A1 | 3/2009 | Graeff et al. | |
| 2011/0282476 A1* | 11/2011 | Hegemier et al. | 700/100 |

* cited by examiner

*Primary Examiner* — James A Reagan
*Assistant Examiner* — Calvin Cheung
(74) *Attorney, Agent, or Firm* — Vazken Alexanian

(57) ABSTRACT

A computer-implemented user feedback method, system and program product for customizing business suite software that is executable on a computer system. The method includes: acquiring a business logic software function associated with a feedback mechanism in a business suite software user interface for the business suite software; acquiring an existing customization requirement related to the business logic software function and the relationship between the existing customization requirement related to the business logic software function and another existing customization requirement related to the business logic software function; and presenting the acquired existing customization requirement and the relationship between the existing customization requirement related to the business logic software function and the other existing customization requirement related to the business logic software function. The system includes: a business logic software function collector; a customization requirement manager; and a customization requirement presenter.

13 Claims, 4 Drawing Sheets

EzPlanning-> new customization requirement | user name: Bill
2009/1/8 9:00AM related requirement:
- ○ creating stock-out sheets for a part of the order forms.
  - △ supporting creating order form ...(1 echo)   Linda, Bill
- ⊙ shelf life
  - △ the checking stocks function must support checking the   Linda
    shelf life of the product
  - △ the shelf life information of the product should be input   Peter
    when stocking-in the produced product
- ○ product batch number
  - it is required to input product batch number when   Peter
    stocking-in a product

[consistent with the existing requirement]   [add new requirement in the existing subject]   [add new subject]   [check the relationship between the requirements]

subject: shelf life content: it is required to verify the shelf life information of the product when stocking out

FIG. 4

USER FEEDBACK METHOD AND SYSTEM FOR BUSINESS SUITE CUSTOMIZATION

CROSS-REFERENCE TO RELATED APPLICATIONS

This application claims priority under 35 U.S.C. §119 to Chinese Patent Application No. 200910161823.1 filed Jul. 31, 2009, the entire contents of which are incorporated by reference herein.

BACKGROUND OF THE INVENTION

1. Field of the Invention

The invention relates to business suite customization, and in particular, to a user feedback method and system for business suite customization.

2. Description of the Related Art

A business suite is a collection of a suit of business software functions for business process management, which provides business process support for enterprises or organizations. The business suite is developed typically in a uniform manner, i.e., the business suite is designed for a certain kind of user group or for a certain industrial domain. This enables repeated use of the same business requirements because certain user groups or users in a certain industrial domain have the most probability of having the same business requirement. Since different users have different skills, preferences, needs and goals, the business suite software requires customization. The existing business suites generally provide some core components capable of satisfying basic requirements in advance, and then different customization needs are collected during the process when enterprise customers utilize the business suite, to perform customization.

In the prior art, the customization mainly is performed in two ways. One way is through interviewing, i.e., the enterprise user introduces business logic to the business suite developer, the developer introduces the current state of the business suite and creates customization requirement according to the business logic provided by the enterprise user, and after the both parties come to an agreement, the developer performs customization on the business suite. This process is time-consuming. At the same time, since the customization requirements do not exist in advance, both parties are required to come to a common understanding on the enterprise business logic and the business suite state, to effectively perform customization. In fact, the enterprise user and the developer usually have some differences in understanding, so that the customization cannot be effectively performed. The other way is that the enterprise user provides comments or makes demands during the trial and testing phase of the business suite, by common communication mechanisms, such as telephone, email, instant message and so on, or by a built-in user feedback mechanism (since the comments and the requirements concern the customization of the business suite, they are collectively referred to as customization requirement). This process is also time-consuming, and meanwhile, since there are a lot of enterprise users, the developer has to deal with various customization requirements from a large number of enterprise users, and understand the inter-relationship among these requirements before performing customization.

SUMMARY OF THE INVENTION

According to an aspect of the invention, a computer-implemented user feedback method is provided for customizing business suite software that is executable on a computer system. The method includes: acquiring a business logic software function associated with a feedback mechanism in a business suite software user interface for the business suite software; acquiring an existing customization requirement related to the business logic software function and the relationship between the existing customization requirement related to the business logic software function and another existing customization requirement related to the business logic software function; and presenting the acquired existing customization requirement and the relationship between the existing customization requirement related to the business logic software function and the other existing customization requirement related to the business logic software function.

According to a further aspect of the invention, a computer-implemented user feedback system is provided for customizing business suite software that is executable on a computer system. The system includes: a business logic software function collector for acquiring a business logic software function associated with a feedback mechanism in a business suite software user interface for the business suite software; a customization requirement manager for acquiring an existing customization requirement related to the business logic software function and the relationship between the existing customization requirement related to the business logic software function and another existing customization requirement related to the business logic software function; and a customization requirement presenter for presenting the acquired existing customization requirement and the relationship between the existing customization requirement related to the business logic software function and the other existing customization requirement related to the business logic software function.

According to another aspect of the present invention, an article of manufacture tangibly embodying computer readable instructions which when implemented, causes a computer to carry out the steps of the method.

BRIEF DESCRIPTION OF THE DRAWINGS

FIG. 4 shows a user feedback interface of the user feedback system for customizing business suite software according to an embodiment of the present invention.

DETAILED DESCRIPTION OF THE PREFERRED EMBODIMENTS

Figure 1:
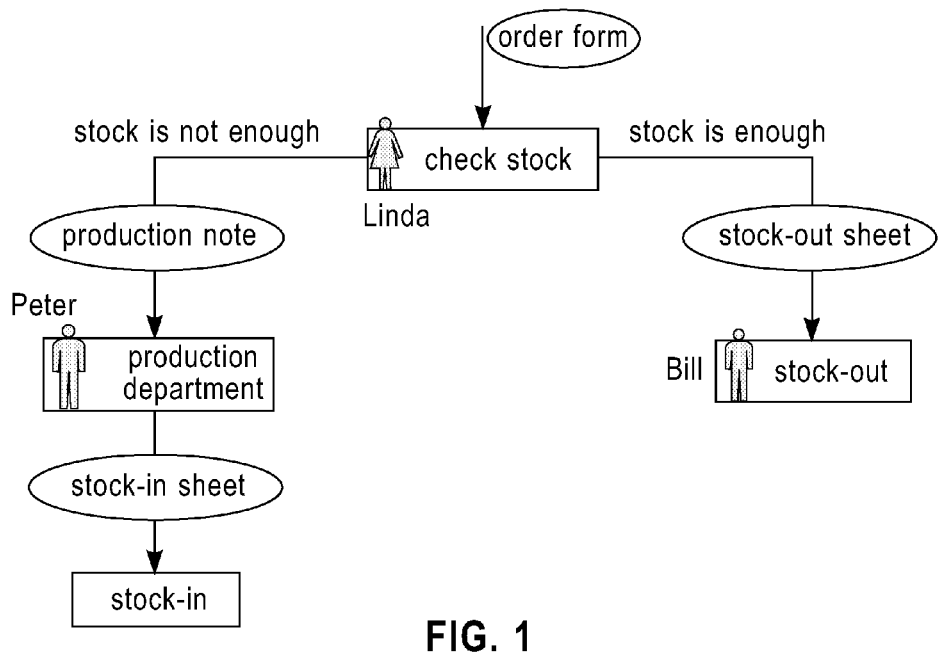
FIG. 1 shows an example of a business logic.

Hereinafter, exemplary embodiments of the invention will be described with reference to the drawings. For clarity and simplification, not all the features of the actual embodiments are described in the specification. However, it should be understood that during developing any practical embodiment many decisions specific to the practical embodiment must be made, to realize the particular target of the developer, for example, to conform those limitation conditions related to the system and the business, and those limitation conditions may vary with different embodiments. In addition, it should be understood that the developing work may be very complicated and time-consuming, but for the person skilled in the art benefiting from the disclosure of the invention, such developing work is only a routine task.

In addition, it is to be noted that, in order to avoid blurring the invention by unnecessary details, only structures and/or processing steps closely related to the solutions of the invention are shown in the drawings, while omitting other details little related to the invention.

Most existing business suites contain a user feedback mechanism. The user feedback mechanism has various representing forms, for example, there can be a comment issuance mechanism in some of the pages of the business suite or there can be a mechanism to acquire feedback by email, instant message and so on, or there can be other mechanisms that allow users to provide feedback. The user feedback mechanism in the prior art is separated from the business logic of the business suite, i.e., the user feedback mechanism only serves as an additional function for the business suite for a user of the business suite to make customization requirements to the developer, so that the developer is able to perform customization on the business suite according to the customization requirements made by the user.

The various customization requirements made by the users normally have internal correlations between them. For example, the customization requirements made by the users working in the warehouse department at the same time are normally correlated. The customization requirements made by the user working in the warehouse department and by the user working in the purchasing department may have correlations of a certain degree. These correlations are brought by the correlations in the relationship between the respective users in the business logic. Separating the relationship between the user feedback mechanism of the existing Business Suite from the business suite complicates the work of the developer in processing various customization requirement.

The user feedback method and system for customizing business suite software that is executable on a computer system according to the present invention will be described in detail below.

With reference to FIG. 1, partial business logic of a cake factory is shown, and the partial business logic can be considered as a business logic relating to order form processing and warehouse managing in the business suite used by the cake factory. FIG. 1 will be described in a flow manner. At the same time, what is shown in FIG. 1 is the business logic originally supported by the business suite provided to the cake factory, i.e., the business logic supported by the business suite without customization. As shown in FIG. 1, when a salesman Linda receives an order form, she first checks the stock, and if the stock is enough for the order form, Linda will issue a stock-out sheet, and a stock manager Bill picks up and delivers goods; if the stock is not enough for the order form, Linda will issue a production note, and the production department finishes the production of goods, and then packer Peter packs them and issues a stock-in sheet so as to put the packed products in the warehouse.

The example in FIG. 1 also shows the positions of the three workers working in the cake factory in the business logic. According to a first embodiment of the present invention, the feedback mechanisms in the respective user interfaces in the business suite and the respective business logic functions in the business suite can be first correlated. For example, the user feedback mechanism in a checking stock page and the "checking stock" function in the business logic are correlated, the feedback mechanism in a stock-out page and the "stock-out" function in the business logic are correlated, the user feedback mechanism in a stock-in page and the "stock-in" function in the business logic are correlated, and so on. Such correlations can be realized by many ways in the prior art, in which one way is to create a link between the feedback mechanism of the business suite user interface and the business logic function, and then store this link by any available approach in the prior art, such as by database, XML and so on.

Figure 2:
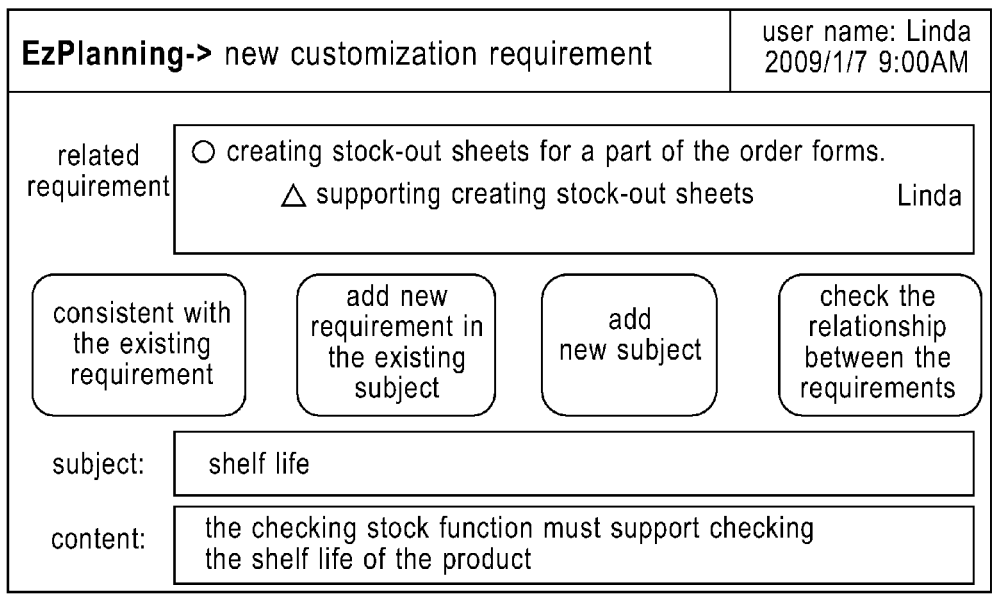
FIG. 2 shows a user feedback interface of a user feedback system for customizing business suite software according to an embodiment of the present invention.

FIG. 2 shows a user feedback interface of a user feedback system for customizing business suite software according to a second embodiment of the present invention. This is an example of the user feedback interface, and the person skilled in the art can use other forms of user feedback interface. When a user attempts to use the feedback mechanism in some user interface in the business suite to make a customization requirement, i.e., activates the feedback mechanism in some user interface in the business suite, the user will be directed to the user feedback system for business suite customization according to the present invention. For example, the user is directed to the user feedback interface of the user feedback system as shown in FIG. 2. At this time, the user feedback system according to the present invention can acquire the existing customization requirement correlated with the business logic function and the relationship between the existing customization requirements, according to the business logic function associated with the feedback mechanism in the user interface in the business suite, and present them to the user, so that the user's customization requirement can be correlated with the business logic function in the business suite when the user makes the customization requirement.

For example, as shown in FIG. 2, the user Linda finds, when operating in the "stock-out" page, that she needs shelf life information of the product when creating the stock-out request, but there is no corresponding function in the current Business Suite. Then, Linda wishes to make the customization requirement—"the checking stock function must support checking the shelf life of the product"—through the user feedback mechanism in the "stock-out" page. At this time, Linda is directed to the user feedback interface as shown in FIG. 2.

As described above, the user feedback mechanisms of the respective user interfaces in the business suite have been correlated with the respective logic functions of the business suite, and since the business suite logic function associated with the user feedback mechanism in the "stock-out" page is "stock-out" function, the user feedback system according to the present invention can first acquire the "stock-out" function, and further acquire the existing customization requirement correlated with the "stock-out" function and the relationship between the existing customization requirements, and present them to Linda. As shown in FIG. 2, since the customization requirement about "creating stock-out sheets for a part of the order forms" previously made by Linda is correlated with the "stock-out" function, it is acquired by the user feedback system, and presented to Linda.

Figure 3:
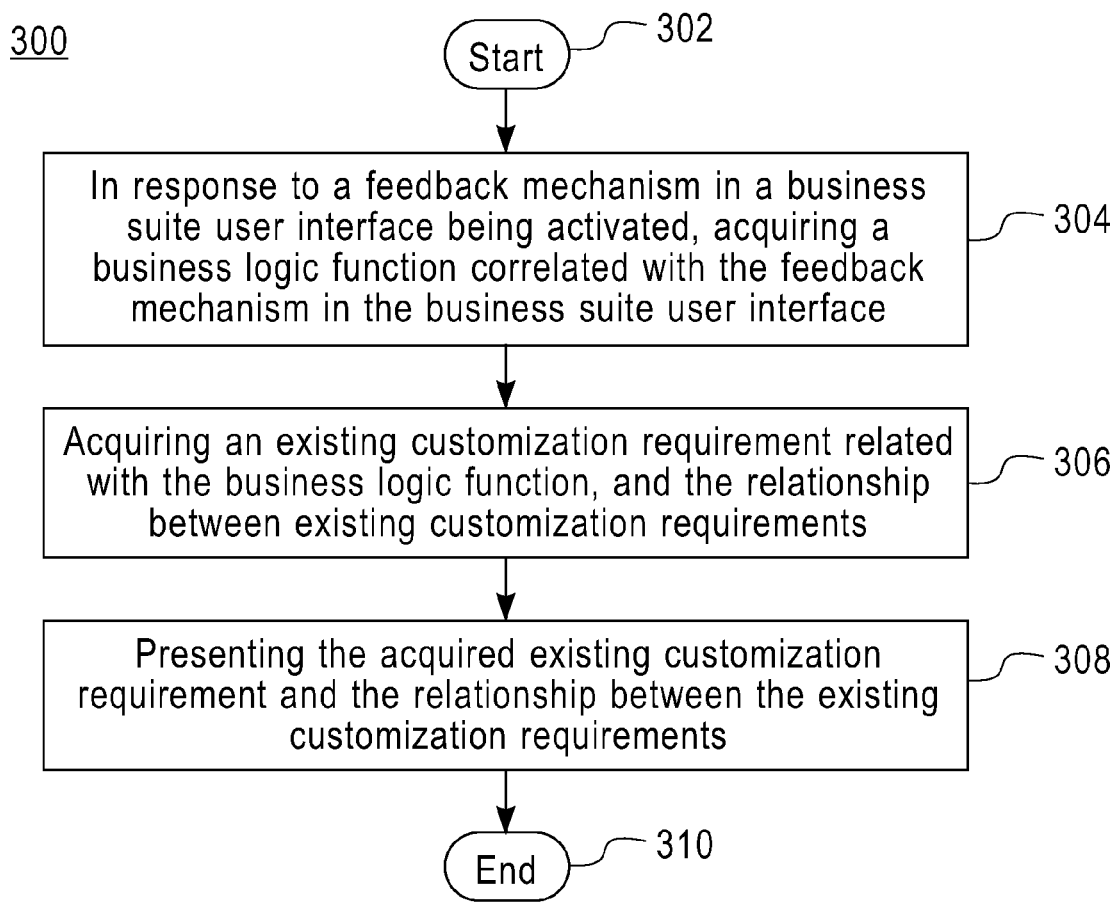
FIG. 3 shows a flowchart of a user feedback method for customizing business suite software according to an embodiment of the present invention.

With reference to FIG. 3, the user feedback method for customizing business suite according to another embodiment of the present invention will be described in detail below. FIG. 3 shows a flowchart of the user feedback method 300 for business suite customization according to the embodiment of the present invention. The user feedback method 300 begins with step 302.

Then, the method proceeds to step 304, in which, in response to the feedback mechanism in the business suite user interface being activated, the business logic function associated with the feedback mechanism of the business suite user interface is acquired. This object can be achieved by storing correspondence relationship between identifiers of the feedback mechanisms in respective user interfaces in the business suite and respective business logic functions in the business suite in advance, and inquiring the correspondence relationship at the time of use, or by acquiring the corresponding user interface identifier by means of the identifiers of the feedback mechanism in the respective user interface in the business suite, and searching the correspondence relationship between the user interface identifiers and the respective business logic functions in the business suite.

Then, the user feedback method 300 proceeds to step 306, in which the existing customization requirement correlated with the business logic function and the relationship between the existing customization requirements are acquired. The existing customization requirements includes all the customization requirements correlated with the business logic function in the user feedback system, and the relationship between the existing customization requirements is the internal connection among the existing customization requirements, and the relationship between the existing customization requirements can be inputted by the user, such as, the relationship between a plurality of existing customization requirements accumulated by Linda correlating, when making the customization requirement about "the checking stock function must support checking the shelf life of the product", the customization requirement and a customization requirement about "the shelf life should be labeled when stocking in a produced product" made by Peter; or the relationship obtained by the user feedback system through performing semantic analysis on the customization requirements.

For example, the system recognizes that the customization requirement made by Linda is correlated with subjects "checking stock function" and "shelf life" by semantic analysis, and the system also recognizes that the customization requirement made by Peter is correlated with subjects "product stock-in", and "shelf life" by semantic analysis. The system recognizes that they both are correlated with the subject "shelf life" by semantic analysis, thereby storing this relationship between them. This relationship can be stored in a tree-based data structure, in which the root node is the common subject among the customization requirements ("shelf life" in this example), and the leaf nodes are respective customization requirements, and the links between the leaf nodes indicate the relationship between the customization requirements. The existing customization requirement and the relationship between the customization requirement can be stored by other data structures in the prior art, such as linked list, array and so on.

After acquiring the above existing customization requirement and the relationship between the existing customization requirements, the user feedback method 300 proceeds to step 308, in which the acquired existing customization requirement and the relationship between the existing customization requirements are presented. The purpose for presenting the existing customization requirement and the relationship between the existing customization requirements to the user is for enabling the user to understand the current state of the existing customization requirement in the user feedback system and thus correlate a new customization requirement with the existing customization requirement according to the relationship between the customization requirements when making the new customization requirement, so that the customization requirements can be stored more effectively for the demands of the customization, and for example, the existing customization requirement and the relationship between the existing customization requirements can be presented through a tree structure or other graphics, and any other manners in the prior art, as long as the above purpose can be attained. Then, the method proceeds to step 310 and is ended.

Since the roles of the users in the business process may be different, i.e., the positions of the user in the business logic of the business suite are different, there is a corresponding user profile for each user, recording information such as roles in the business process and the like, and the user feedback method according to the present invention also can further filter the existing customization requirements by using the user profile, thereby obtaining the existing customization requirement that is further correlated with the user and the relationship between the existing customization requirements. That is, the user feedback method for business suite customization according to the present invention can further include acquiring the user profile, and further acquiring the existing customization requirement related to the content of the user profile and the relationship between the existing customization requirements.

For example, Linda is a salesman, so her corresponding user profile will record her position in the business logic. With respect to the business logic of FIG. 1, Linda is directly in charge of the checking stock function, and she will also become involved in the production and stock-out functions in the business logic. The information will all be recorded in her user profile, and other information such as the operating habit of the user and the like may also be recorded in the user profile. All the information recorded in the user profile can be used to further filter the existing customization requirements. When Linda tries to make a customization requirement by the user feedback mechanism in the "stock-out" page, she is directed to the user feedback interface as shown in FIG. 2.

At this time, in addition to the processes as shown in FIG. 3, the user feedback system according to the present invention can further acquire Linda's user profile, and further acquire the existing customization requirement correlated with the content in Linda's user profile and the relationship between the existing customization requirements. Since Linda's user profile records that she will be involved in checking stock, producing and stocking-out functions in the business logic, the existing customization requirement correlated with the stock, production and stock-out functions and the relationship between the existing customization requirements will also be acquired.

For example, in addition to the customization requirement, "creating stock-out sheets for a part of the order forms," which was previously made by Linda, the customization requirement, "it is required to input product batch number when stocking-in a product," made by Peter, the packer of the production department, and the relationship between this requirement and other existing customization requirements can also be acquired and presented to Linda.

Alternatively, when the user inputs a new customization requirement, the user feedback method for business suite customization according to the embodiment of the present invention can further include: receiving the new customization requirement inputted by the user; acquiring the relationship between the new customization requirement and the existing customization requirement by semantic analysis; if there is no existing customization requirement consistent with the new customization requirement, storing the new customization requirement and the relationship between the existing customization requirement and the new customization requirement; alternatively, if there is no existing customization requirement consistent with the new customization requirement, presenting to the user the acquired relationship between the existing customization requirement and the new customization requirement inputted by the user, receiving the user verification result on the above relationship; and storing the user-verified new customization requirement and the relationship between the new customization requirement and the existing customization requirement.

Described above is the process of the user feedback system for business suite customization according to the present invention when the user inputs a new customization requirement. Still taking the above cake factory as an example, Linda makes the customization requirement, "the checking stock function must support checking the shelf life of the product," through the feedback mechanism. The user feedback mechanism analyzes that there is correlation between this requirement and the requirement, "the shelf life of the product should be input when stocking-in the produced product," previously made by Peter. Thereafter, the user feedback system stores this correlation, or after this correlation is confirmed by Linda, Linda's requirement and the requirement, "the shelf life of the product should be input when stocking-in the produced product," previously made by Peter, are stored under the same subject "shelf life". Alternatively, the user can also directly input the relationship between the existing customization requirement and the new customization requirement inputted by the user.

Since for different customization requirements, the levels of concern or attention received are different, according to another embodiment of the present invention, the weight of the customization requirement can be utilized to indicate the level of concern. Alternatively, when a user inputs a new customization requirement, the user feedback method for business suite customization according to the embodiment of the present invention further includes: receiving the new customization requirement inputted by the user; acquiring the relationship between the existing customization requirement and the new customization requirement inputted by the user through semantic analysis; and if there is an existing customization requirement consistent with the new customization requirement, a weight of the existing customization requirement consistent with the new customization requirement is increased.

Alternatively, if there is an existing customization requirement consistent with the new customization requirement, the existing customization requirement consistent with the new customization requirement is presented to the user to be verified by the user, the user's verification result is received, and a weight of the existing customization requirement consistent with the new customization requirement after verified by the user is increased. If there is no existing customization requirement consistent with the new customization requirement, the new customization requirement and the relationship between the existing customization requirement and the new customization requirement are stored.

Still taking the above cake factory as an example, when the salesman Linda makes a customization requirement, "creating stock-out sheets for a part of the order forms," through the user feedback interface, and submits it, the user feedback system analyzes the existing customization requirement, and acquires the relationship between the existing customization requirement and the customization requirement, "creating stock-out sheets for a part of the order forms". For example, the system acknowledges that the customization requirement, "creating stock-out sheets for a part of the order forms," is consistent with the customization requirement, "creating stock-out sheets for a part of the order forms," which was previously made by Linda through semantic analysis. After this analysis result is confirmed by Linda, the user feedback system will increase the weight of the requirement, "creating stock-out sheets for a part of the order forms".

Alternatively, when the user inputs a new customization requirement, and further inputs the relationship between the new customization requirement and the existing customization requirement, the user feedback method for business suite customization according to an embodiment of the invention further includes: receiving the new customization requirement input by the user; receiving the relationship between the new customization requirement input by the user and the existing customization requirement; verifying the relationship between the new customization requirement input by the user and the existing customization requirement; and storing the relationship between the new customization requirement input by the user and the existing customization requirement verified by the system. The purpose for this is to avoid the erroneously storing of the relationship between the customization requirements caused by the user's mis-operation. Since the feedback system according to the present invention presents to the user the existing customization requirement and the relationship between the existing customization requirements, so that the user can view the current state of the existing customization requirement in the user feedback system, when submitting the new customization requirement, the user can correlate the new customization requirement with the existing customization requirement according to the relationship between customization requirements.

Still taking the above cake factory as an example, when the salesman Linda makes the customization requirement, "the checking stock function must support checking the shelf life of the product," and submits it, the user feedback system analyzes the existing customization requirement, acquires the relationship between the existing customization requirement and the customization requirement, "the checking stock function must support checking the shelf life of the product," made by Linda, and presents the above relationship to the user. For example, by semantic analysis, the system can obtain the customization requirement, "the checking stock function must support checking the shelf life of the product," made by Linda and the customization requirement, "the shelf life of the product should be input when stocking-in the produced product," previously made by Peter are both related to the topic of "shelf life", and the above relationship is presented to Linda. At this time, by choosing the customization requirement, "the shelf life of the product should be input when stocking-in the produced product," made by Peter and clicking a button such as "agree with an existing customization requirement", Linda can indicate that her requirement is consistent with this requirement.

At this time, there mis-operation may occur. For example, Linda can mistakenly select an existing customization requirement, "needing to input product batch number when stocking-in a product," made by Peter, and click the button such as "agree with an existing customization requirement" to indicate that her requirement is consistent with this requirement, so that the relationship between the input new customization requirement and the existing customization requirement is incorrect.

In the above case, according to the present invention, after receiving the new customization requirement inputted by the user and the relationship between the new customization requirement and the existing customization requirement, by verifying the relationship between the new customization requirement inputted by the user and the existing customization requirement by the means of semantic analysis and so on, or by the user's verification, the user feedback system can correctly store the relationship between the new customization requirement inputted by the user and the existing customization requirement. In the above situation, through the verification, the user feedback system can acknowledge that the relationship between the customization requirement input by Linda and the existing customization requirement is not correct, the customization requirement made by Linda should be correlated with the customization requirement, "the shelf life of the product should be input when stocking-in the produced product". Thus, the system prompts Linda to make a correction, and after Linda's verification, the customization requirement, "the checking stock function must support checking the shelf life of the product," is stored.

FIG. 4 shows the exemplary user feedback interface after those processes described above have been performed. Since Linda and Bill both made the customization requirement, "creating stock-out sheets for a part of the order forms", its weigh is increased (represented as "1 echo" in FIG. 4). At the same time, FIG. 4 further shows the relationship between other existing customization requirement and the existing customization requirement.

Figure 5:
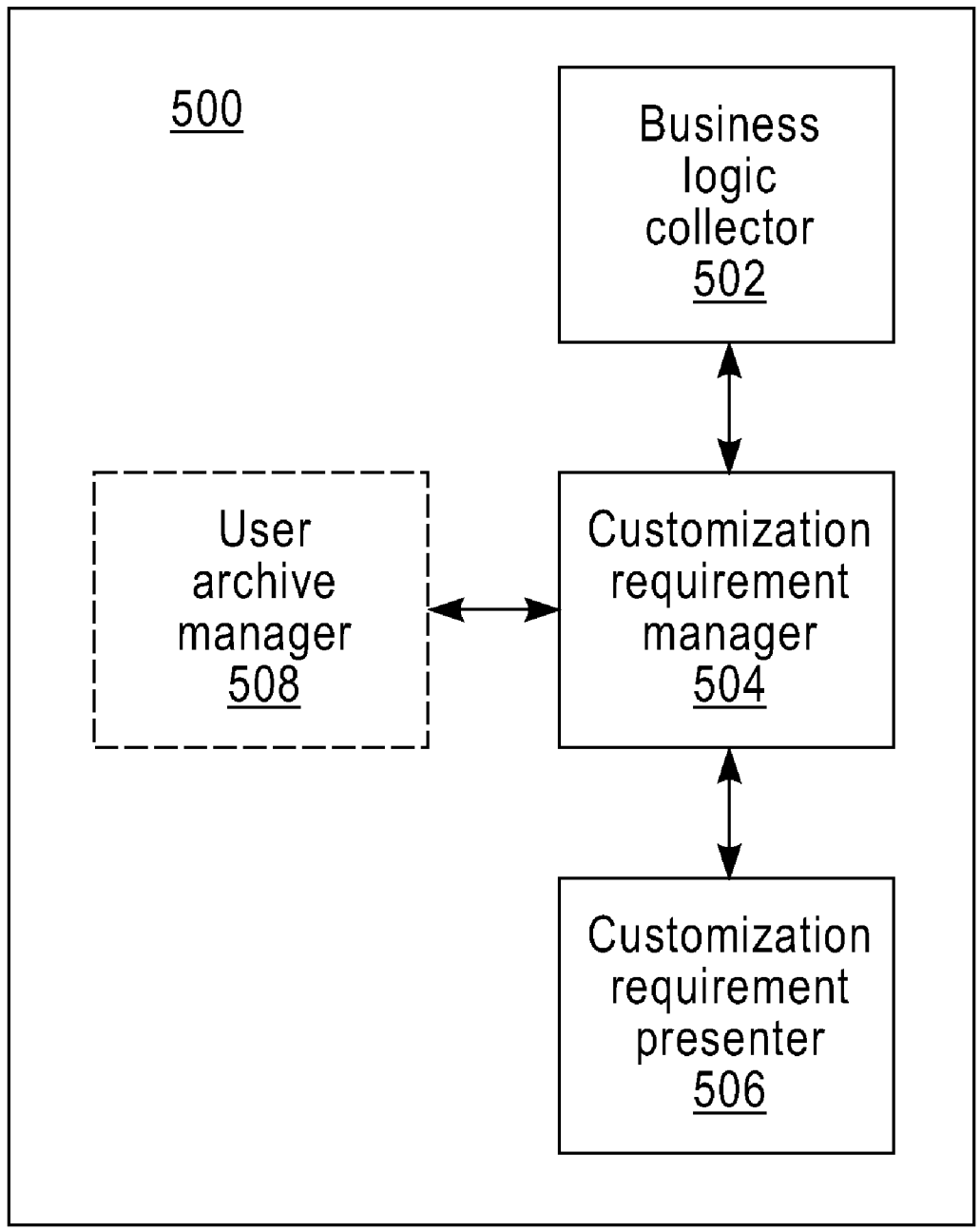
FIG. 5 shows a structural block diagram of the user feedback system for customizing business suite software according to an embodiment of the present invention.

Below, with reference to FIG. 5, a user feedback system 500 for business suite customization according to the present invention is described. The feedback mechanism in the business suite user interface is related to the business logic function of the business suite, and the user feedback system 500 includes: a business logic collector 502 for acquiring the business logic function associated with the feedback mechanism in the business suite user interface in response to the feedback mechanism in the business suite user interface being activated; a customization requirement manager 504 for acquiring the existing customization requirement related to the business logic function and the relationship between the existing customization requirements; and a customization requirement presenter 506 for presenting the acquired existing customization requirement and the relationship between the existing customization requirements.

According to one aspect of the present invention, the user feedback system for business suite customization can further include a user profile manager 508 for acquiring a user profile of a business suite user, where the customization requirement manager further acquires the existing customization requirement related to the user profile and the relationship between the existing customization requirements.

Alternatively, the customization requirement manager can further receive the new customization requirement inputted by the user, acquire the relationship between the existing customization requirement and the new customization requirement inputted by the user, and store the new customization requirement and the relationship between the existing customization requirement and the new customization requirement.

Alternatively, the customization requirement manager can receive the new customization requirement inputted by the user, acquire the relationship between the existing customization requirement and the new customization requirement inputted by the user, and in response to the presence of the existing customization requirement consistent with the new customization requirement, increase the weight of the existing customization requirement consistent with the new customization requirement.

Alternatively, the customization requirement manager can receive the new customization requirement inputted by the user, receive the relationship between the new customization requirement inputted by the user and the existing customization requirement, verify the relationship between the new customization requirement inputted by the user and the existing customization requirement, and store the relationship between the new customization requirement and the existing customization requirement verified by the system.

The basic principle of the present invention is described above in connection with the particular embodiments, but it is to be noted that, for the person skilled in the art, he can understand all or any step or means of the method and the apparatus of the present invention can be implemented in any computing device (including processor, and storage medium and so on) or a network of computing device, in hardware, firmware, software or combination thereof. This can be implemented by the person skilled in the art after reading the specification of the present invention, using their basic programming skills.

Thus, the present invention can be implemented by running a program or a set of programs on a computing device. The computing device can be a well-known general-purpose device. the present invention can also be implemented by a program product that contains program codes for executing the method or apparatus. That is, the present invention can include such a program product or a storage medium for storing such a program product. The storage medium can be a known storage medium or a storage medium which will be developed in the future.

It is also to be noted that, in the apparatus and method of the present invention, each means or each step can be split and/or recombined. Such split and/or recombination should be considered as an equivalent solution of the present invention. Further, the steps for performing the above series of processes can be performed in chronological order according to the illustrative order, but need not be performed in chronological order. Some steps can be performed in parallel or independently with each other.

Although the present invention and its advantages have been described in detail, it should be understood that a modification, substitution and alternation can be made without departing from the spirit and the scope of the present invention defined by the attached claims. The terms "including", "containing" or any other variation of the application are intended to cover the non-exclusive including, so that the procedure, method, article or means including a series of elements, not only include these elements, but also include other elements not definitely listed here, or include inherent elements for the procedure, method, article or means. Without other limitations, the element defined by the sentence "including a . . . " does not exclude another same element present in the procedure, method, article or means including the element.

What is claimed is:

1. A computer-implemented user feedback method for customizing business suite software that is executable on a computer system, said method comprising:

acquiring a business logic software function associated with a feedback mechanism in a business suite software user interface for said business suite software, wherein said step of acquiring a business logic software function associated with a feedback mechanism in a business suite software user interface is performed in response to said feedback mechanism in said business suite software user interface being activated;

acquiring an existing customization requirement related to said business logic software function and the relationship between said existing customization requirement related to said business logic software function and another existing customization requirement related to said business logic software function; and presenting said acquired existing customization requirement and said relationship between said existing customization requirement related to said business logic software function and said other existing customization requirement related to said business logic software function;

increasing a weight of said existing customization requirement consistent with a new customization requirement, wherein said increasing step is performed if said existing customization requirement is consistent with said new customization requirement;

wherein said step of increasing the weight of said existing customization requirement consistent with said new customization requirement comprises:

presenting said existing customization requirement consistent with said new customization requirement to said user to be verified by said user;

receiving said user's verification result; and increasing the weight of said existing customization requirement consistent with said new customization requirement verified by said user.

2. The method according to claim 1, further comprising:

acquiring a user profile of a business suite software user of said business suite software; and acquiring an existing customization requirement related to the content of said user profile, and the relationship between said existing customization requirement related to said content of said user profile and another existing customization requirement related to said content of said user profile or another existing customization requirement related to the content of another user profile of another business suite software user of said business suite software.

3. The method according to claim 1, further comprising:

receiving a new customization requirement input by a business suite software user of said business suite software; and acquiring, by semantic analysis, the relationship between said existing customization requirement related to said business logic software function and said new customization requirement input by said user.

4. The method according to claim 3, further comprising:

storing said new customization requirement and said relationship between said new customization requirement and said existing customization requirement, wherein said storing step is performed if said existing customization requirement is not consistent with said new customization requirement.

5. The method according to claim 4, wherein said step of storing said new customization requirement and said relationship between said new customization requirement and said existing customization requirement comprises:

presenting to said user said acquired relationship between said existing customization requirement and said new customization requirement input by said user, receiving said user's verification result on said relationship; and storing said new customization requirement and said relationship between said new customization requirement and said existing customization requirement verified by said user.

6. The method according to claim 1, further comprising:

receiving a new customization requirement input by a user of said business suite software;

receiving the relationship between said new customization requirement input by said user and said existing customization requirement;

verifying said relationship between said new customization requirement input by said user and said existing customization requirement; and storing said verified relationship between said new customization requirement and said existing customization requirement.

7. A computer-implemented user feedback system associated with a memory for customizing business suite software that is executable on a computer system, said system comprising:

a business logic software function collector for acquiring a business logic software function associated with a feedback mechanism in a business suite software user interface for said business suite software, wherein acquiring a business logic software function associated with a feedback mechanism in a business suite software user interface for said business suite software is performed in response to said feedback mechanism in said business suite software user interface being activated;

a customization requirement manager for acquiring an existing customization requirement related with said business logic software function and the relationship between said existing customization requirement related to said business logic software function and another existing customization requirement related to said business logic software function; and a customization requirement presenter for presenting said acquired existing customization requirement and said relationship between said existing customization requirement related to said business logic software function and said other existing customization requirement related to said business logic software function;

wherein said customization requirement manager further increases a weight of said existing customization requirement consistent with a new customization requirement if said existing customization requirement is consistent with said new customization requirement;

wherein, if said existing customization requirement is consistent with said new customization requirement, said customization requirement manager further:

(i) presents said existing customization requirement consistent with said new customization requirement to said user to be verified by said user, (ii) receives said user's verification result, and (iii) increases the weight of said existing customization.

8. The system according to claim 7, further comprising:

a user profile manager for acquiring a user profile of a business suite software user, and wherein said customization requirement manager further acquires an existing customization requirement related to the content of said user profile and the relationship between said existing customization requirement related to said content of said user profile and another existing customization requirement related to said content of said user profile or another existing customization requirement related to the content of another user profile of another business suite software user of said business suite software.

9. The system according to claim 7, wherein said customization requirement manager further (i) receives a new customization requirement input by a business suite software user of said business suite software and (ii) acquires, by semantic analysis, the relationship between said existing customization requirement related to said business logic software function and said new customization requirement input by said user.

10. The system according to claim 9, wherein said customization requirement manager further stores said new customization requirement and said relationship between said new customization requirement and said existing customization requirement if said existing customization requirement is not consistent with said new customization requirement.

11. The system according to claim 10, wherein if said existing customization requirement is not consistent with said new customization requirement, said customization requirement presenter further presents to said user said acquired relationship between said existing customization requirement and said new customization requirement input by said user; and said customization requirement manager further (i) receives said user's verification result on said acquired relationship between said existing customization requirement and said new customization requirement input by said user and (ii) stores said new customization requirement and said relationship between said existing customization requirement and said new customization requirement verified by said user.

12. The system according to claim 7, wherein said customization requirement manager further (i) receives a new customization requirement input by a business suite software user of said business suite software, (ii) receives the relationship between said new customization requirement input by said user and said existing customization requirement, (iii) verifies said relationship between said new customization requirement input by said user and said existing customization requirement, (iv) and stores said verified relationship between said new customization requirement and said existing customization requirement verified by system.

13. An article of manufacture tangibly embodying computer readable instructions which when implemented, causes a computer to carry out the steps of a computer-implemented user feedback method for customizing business suite software that is executable on a computer system comprising:

acquiring a business logic software function associated with a feedback mechanism in a business suite software user interface for said business suite software, wherein said step of acquiring a business logic software function associated with a feedback mechanism in a business suite software user interface is performed in response to said feedback mechanism in said business suite software user interface being activated;

acquiring an existing customization requirement related to said business logic software function and the relationship between said existing customization requirement related to said business logic software function and another existing customization requirement related to said business logic software function;

presenting said acquired existing customization requirement and said relationship between said existing customization requirement related to said business logic software function and said other existing customization requirement related to said business logic software function;

increasing a weight of said existing customization requirement consistent with a new customization requirement, wherein said increasing step is performed if said existing customization requirement is consistent with said new customization requirement;

wherein said step of increasing the weight of said existing customization requirement consistent with said new customization requirement comprises:

presenting said existing customization requirement consistent with said new customization requirement to said user to be verified by said user;

receiving said user's verification result; and increasing the weight of said existing customization requirement consistent with said new customization requirement verified by said user.

* * * * *